United States Patent
Gaubatz et al.

(10) Patent No.: US 8,446,494 B2
(45) Date of Patent: May 21, 2013

(54) AUTOMATIC REDEYE DETECTION BASED ON REDEYE AND FACIAL METRIC VALUES

(75) Inventors: Matthew D. Gaubatz, Ithaca, NY (US); Robert Alan Ulichney, Marlborough, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 300 days.

(21) Appl. No.: 12/865,855

(22) PCT Filed: Feb. 1, 2008

(86) PCT No.: PCT/US2008/001380
§ 371 (c)(1),
(2), (4) Date: Aug. 2, 2010

(87) PCT Pub. No.: WO2009/096920
PCT Pub. Date: Aug. 6, 2009

(65) Prior Publication Data
US 2011/0001850 A1    Jan. 6, 2011

(51) Int. Cl.
*H04N 5/217* (2006.01)
(52) U.S. Cl.
USPC ........... 348/241; 348/275; 382/163; 382/164; 382/165; 382/190; 382/275
(58) Field of Classification Search
None
See application file for complete search history.

(56) References Cited

U.S. PATENT DOCUMENTS

| | | | |
|---|---|---|---|
| 5,432,863 A | 7/1995 | Benati et al. | |
| 6,009,209 A | 12/1999 | Acker et al. | |
| 6,016,354 A | 1/2000 | Lin et al. | |
| 6,292,574 B1 | 9/2001 | Schildkraut et al. | |
| 7,116,820 B2 | 10/2006 | Luo et al. | |
| 2002/0176623 A1 | 11/2002 | Steinberg | |
| 2003/0202105 A1* | 10/2003 | Gaubatz et al. | 348/207.99 |
| 2004/0184690 A1 | 9/2004 | Suzuki et al. | |

(Continued)

FOREIGN PATENT DOCUMENTS

| | | |
|---|---|---|
| EP | 1626569 A1 | 2/2006 |
| JP | 2005-286830 | 10/2005 |

(Continued)

OTHER PUBLICATIONS

M. Gaubatz and R. Ulichney, "Automatic red-eye detection and correction," proc. IEEE ICIP 2002, vol. 1, pp. 804-807.

(Continued)

*Primary Examiner* — Roberto Velez
*Assistant Examiner* — Abdelaaziz Tissire

(57) ABSTRACT

Candidate redeye areas (24) are determined in an input image (20). In this process, a respective set of one or more redeye metric values (28) is associated with each of the candidate redeye areas (24). Candidate face areas (30) are ascertained in the input image (20). In this process, a respective set of one or more face metric values (34) is associated with each of the candidate face areas (30). A respective joint metric vector (78) is assigned to each of the candidate redeye areas (24). The joint metric vector (78) includes metric values that are derived from the respective set of redeye metric values (28) and the set of face metric values (34) associated with a selected one of the candidate face areas (30). Each of one or more of the candidate redeye areas (24) is classified as either a redeye artifact or a non-redeye artifact based on the respective joint metric vector (78) assigned to the candidate redeye area (24).

20 Claims, 9 Drawing Sheets

U.S. PATENT DOCUMENTS

| | | | |
|---|---|---|---|
| 2004/0196503 A1 | 10/2004 | Kurtenbach et al. | |
| 2004/0233299 A1* | 11/2004 | Ioffe et al. | 348/239 |
| 2005/0031224 A1* | 2/2005 | Prilutsky et al. | 382/275 |
| 2005/0047655 A1* | 3/2005 | Luo et al. | 382/167 |
| 2005/0169520 A1* | 8/2005 | Chen et al. | 382/165 |
| 2005/0207649 A1* | 9/2005 | Enomoto et al. | 382/190 |
| 2005/0220347 A1* | 10/2005 | Enomoto et al. | 382/190 |
| 2005/0276481 A1 | 12/2005 | Enomoto | |
| 2008/0170778 A1* | 7/2008 | Luo | 382/164 |
| 2008/0219518 A1* | 9/2008 | Steinberg et al. | 382/118 |
| 2008/0298704 A1* | 12/2008 | Nachlieli et al. | 382/254 |

FOREIGN PATENT DOCUMENTS

| | | |
|---|---|---|
| JP | 2008-022502 | 1/2008 |
| KR | 1020060054004 | 5/2006 |
| KR | 1020060121533 | 11/2006 |
| KR | 1020070092267 | 9/2007 |

OTHER PUBLICATIONS

R. Schettini, F. Gasparini and F. Chazli, "A modular procedure for automatic redeye correction in digital photos," proc. SPIE Color Imaging IX, 2003.

H. Luo, J. Yen and D. Tretter, "An Efficient Automatic Redeye Detection and Correction algorithm," proc. IEEE ICPR 2-4, vol. 2, pp. 883-886.

P. Corcoran, P. Bigioi, E. Steinberg and A. Pososin, "Automatic In-Camera Detection of Flash Eye-Defects," proc. IEEE ICCE 2005.

L. Zhang, Y. Sun, M. Li and H. Zhang, "Automated red-eye detection and correction in digital photographs," proc. IEEE ICIP 2004, vol. 4, pp. 2363-2366.

J. S. Schildkraut and R.T. Gray, "A fully automatic redeye detection and correction algorithm," proc. IEEE ICIP 2002, vol. 1, pp. 801-803.

P. Huang, Y. Chien and S. Lai, "Automatic multi-layer red-eye detection," proc. IEEE ICIP 2006, pp. 2013-2016.

J. Willamowski, and G. Csurka, "Probabilistic automatic red eye detection and correction," proc. IEEE ICPR 2006, vol. 3, pp. 762-765.

X. Miao and T. Sim, "Automatic red-eye detection and removal", proc. IEEE ICME 2004, vol. 2, pp. 1195-1198.

R. Youmaran and A. Adler, "Using red-eye to improve face detection in low quality video images," proc. IEEE CCECE/CCGEI 2006, pp. 1940-1943.

F. Volken, J. Terrier and P. Vandewalle, "Automatic red-eye removal based on sclera and skin tone detection," proc. IS&T CGIV 2006, pp. 359-364.

R. Ulichney and M. Gaubatz, "Perceptual-Based Correction of Photo Red-Eye", Proc. of the 7th IASTED International Conf. on Signal and Image Processing, 2005.

Paul Viola et al., "Robust real-time object detection," Second International Workshop on Statistical and Computational Theories Of Vision—Modeling, Learning, Computing, And Sampling, Vancouver, Canada, Jul. 13, 2001.

Hsu et al., "Face detection in color images," Transactions on Pattern Analysis and Machine Intelligence, vol. 24, Issue 5, May 2002 pp. 696-706.

Garcia et al., "Face detection using quantized skin color regions merging andwavelet packet analysis," IEEE Transactions on Multimedia, vol. 1, Issue: 3, pp. 264-277 (Sep. 1999).

\* cited by examiner

AUTOMATIC REDEYE DETECTION BASED ON REDEYE AND FACIAL METRIC VALUES

BACKGROUND

Redeye is the appearance of an unnatural reddish coloration of the pupils of a person appearing in an image captured by a camera with flash illumination. Redeye is caused by light from the flash reflecting off blood vessels in the person's retina and returning to the camera.

Several techniques have been proposed to reduce the redeye effect. A common redeye reduction solution for cameras with a small lens-to-flash distance is to use one or more pre-exposure flashes before a final flash is used to expose and capture an image. Each pre-exposure flash tends to reduce the size of a person's pupils and, therefore, reduce the likelihood that light from the final flash will reflect from the person's retina and be captured by the camera. In general, pre-exposure flash techniques typically only will reduce, but not eliminate, redeye.

A large number of image processing techniques have been proposed to detect and correct redeye in color images. In general, these techniques typically are semi-automatic or automatic. Semi-automatic redeye detection techniques rely on human input. For example, in some semi-automatic redeye reduction systems, a user must manually identify to the system the areas of an image containing redeye before the defects can be corrected. Many automatic redeye reduction systems rely on a preliminary face detection step before redeye areas are detected. A common automatic approach involves detecting faces in an image and, subsequently, detecting eyes within each detected face. After the eyes are located, redeye is identified based on shape, coloration, and brightness of image areas corresponding to the detected eye locations.

SUMMARY

In one aspect, the invention features a method of processing an input image. In accordance with this inventive method, candidate redeye areas are determined in the input image. In this process, a respective set of one or more redeye metric values is associated with each of the candidate redeye areas. Candidate face areas are ascertained in the input image. In this process, a respective set of one or more face metric values is associated with each of the candidate face areas. A respective joint metric vector is assigned to each of the candidate redeye areas. The joint metric vector includes metric values that are derived from the respective set of redeye metric values and the set of face metric values associated with a selected one of the candidate face areas. Each of one or more of the candidate redeye areas is classified as either a redeye artifact or a non-redeye artifact based on the respective joint metric vector assigned to the candidate redeye area. At least one of the candidate redeye areas that is classified as a redeye artifact is corrected.

The invention also features apparatus and a computer readable medium storing computer-readable instructions causing a computer to implement the method described above.

Other features and advantages of the invention will become apparent from the following description, including the drawings and the claims.

DETAILED DESCRIPTION

Figure 1:
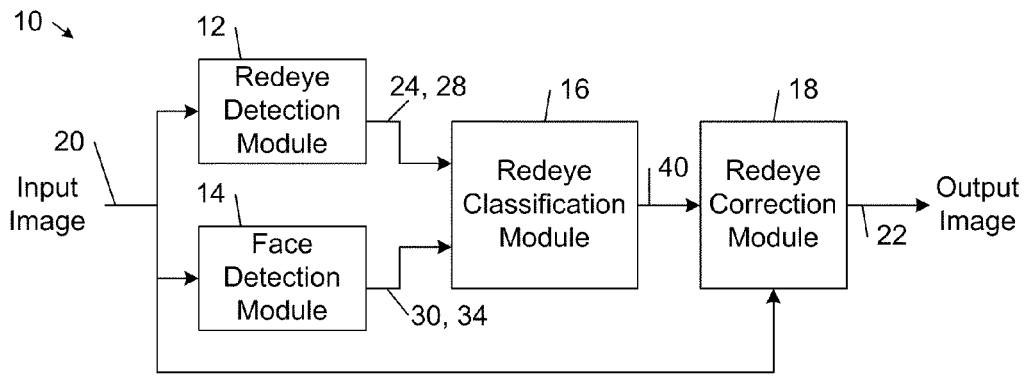
FIG. 1 is a block diagram of an embodiment of an image processing system that includes a redeye detection module, a face detection module, a redeye classification module, and a redeye correction module.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. OVERVIEW

The embodiments that are described in detail herein are capable of detecting redeye artifacts in images. These embodiments leverage both redeye detection and face detection processes to achieve accurate detection of redeye artifacts with low false positive rates. In this way, these embodiments achieve a better trade-off between false positives and detected artifacts. In addition, these embodiments can be implemented with reduced computational expense of the face-detection component. Due to their efficient use of processing and memory resources, the embodiments that are described herein readily may be implemented in a variety of different application environments, including applications environments, such as embedded environments, which are subject to significant processing and memory constraints.

II. DEFINITION OF TERMS

As used herein, the term "feature" refers to one or both of the result of a general neighborhood operation (feature extractor or feature detector) applied to an image and a specific structure or multiple structures in the image itself. The structures typically range from simple structures (e.g., points and edges) to more complex structures (e.g., objects).

A "feature vector" is an N-dimensional vector of numerical feature values that contain information regarding an image or a portion of an image (e.g., one or more image forming elements of the image), where N has an integer value greater than one.

The term "image forming element" refers to an addressable region of an image. In some embodiments, the image forming elements correspond to pixels, which are the smallest addressable units of an image. Each image forming element has at least one respective value that is represented by one or more bits. For example, an image forming element in the RGB color space includes a respective value for each of the colors red, green, and blue, where each of the values may be represented by one or more bits.

An "image area" (also referred to as an "image patch") means a set of contiguous image forming elements that make up a part of an image.

The term "data structure" refers to the physical layout (or format) in which data is organized and stored.

A "computer" is a machine that processes data according to machine-readable instructions (e.g., software) that are stored on a machine-readable medium either temporarily or permanently. A set of such instructions that performs a particular task is referred to as a program or software program.

The term "machine-readable medium" refers to any medium capable carrying information that is readable by a machine (e.g., a computer). Storage devices suitable for tangibly embodying these instructions and data include, but are not limited to, all forms of non-volatile computer-readable memory, including, for example, semiconductor memory devices, such as EPROM, EEPROM, and Flash memory devices, magnetic disks such as internal hard disks and removable hard disks, magneto-optical disks, DVD-ROM/RAM, and CD-ROM/RAM.

III. INTRODUCTION

FIG. 1 shows an embodiment of an image processing system 10 that includes a redeye detection module 12, a face detection module 14, a redeye classification module 16, and a redeye correction module 18. In operation, the image processing system 10 processes an input image signal 20 to produce a redeye-corrected output image 22.

The input image 20 may correspond to any type of digital image, including an original image (e.g., a video frame, a still image, or a scanned image) that was captured by an image sensor (e.g., a digital video camera, a digital still image camera, or an optical scanner) or a processed (e.g., down-sampled, filtered, reformatted, scene-balanced or otherwise enhanced or modified) version of such an original image. In some embodiments, the input image 20 is an original full-sized image, the face detection module 14 processes a down-sampled version of the original full-sized image, and the redeye detection module 12 and the redeye correction module 18 both process the original full image 20.

Figure 2:
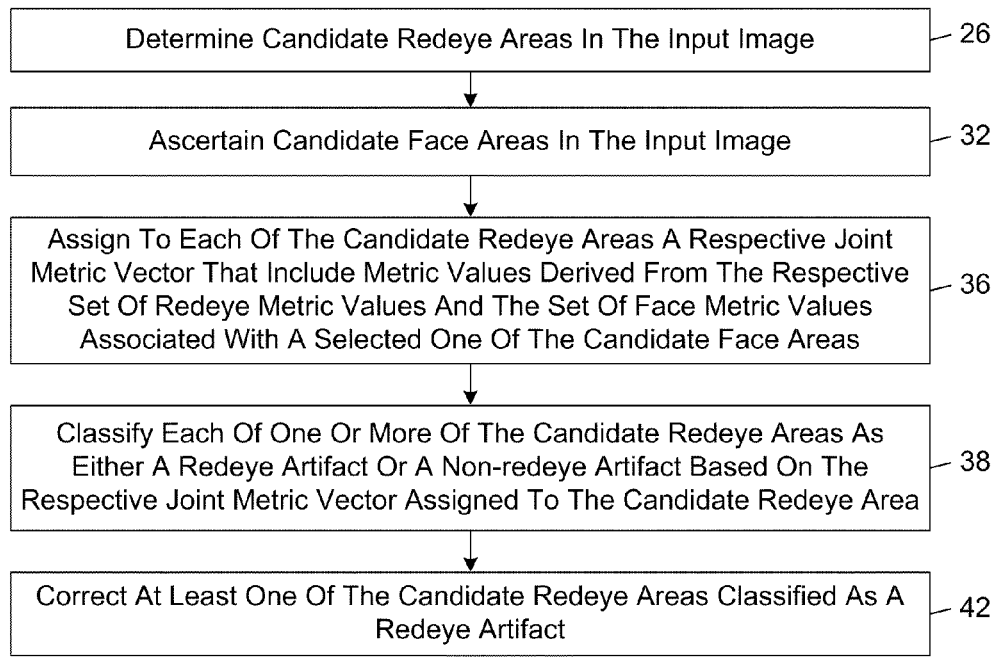
FIG. 2 is a flow diagram of an embodiment of an image processing method.

FIG. 2 shows an embodiment of a method that is implemented by the image processing system 10.

The redeye detection module 12 determines candidate redeye areas 24 in the input image 20 (FIG. 2, block 26). In this process, the redeye detection module 12 associates with each of the candidate redeye areas 24 a respective set of one or more redeye metric values 28. Each of the redeye metric values 28 provides a respective indication of a degree to which the respective candidate redeye areas correspond to a redeye artifact. In some embodiments, at least one of the redeye metric values 28 corresponds to a measure (e.g., a probability) of the confidence that the associated candidate redeye area 24 corresponds to a redeye artifact, and one or more of the other redeye metric values 28 provide respective indications that the associated candidate redeye area 24 includes respective redeye features.

The face detection module 14 ascertains candidate face areas 30 in the input image 20 (FIG. 2, block 32). In this process, the face detection module 14 associates with each of the candidate face areas 30 a respective set of one or more face metric values 34. Each of the face metric values 34 provides a respective indication of a degree to which the respective candidate face areas correspond to a face. In some embodiments, at least one of the face metric values 34 corresponds to measure (e.g., a probability) of the confidence that the respective candidate face area 30 corresponds to a face, and one or more of the other face metric values 34 provide respective indications that the candidate face area 30 includes respective facial features.

The redeye classification module 16 assigns to each of the candidate redeye areas 24 a respective joint metric vector that includes metric values that are derived from the respective set of redeye metric values 28 and the set of face metric values 34 that is associated with a selected one of the candidate face areas 30 (FIG. 2, block 36). The redeye classification module 16 also classifies each of one or more of the candidate redeye areas 24 as either a redeye artifact or a non-redeye artifact based on the respective joint metric vector that is assigned to the candidate redeye area (FIG. 2, block 38). The redeye classification module 16 passes the classification results 40 to the redeye correction module 18. The classification results 40 may be presented to the redeye correction module 18 in variety of different data structure formats (e.g., a vector, table, or list). In some embodiments, the classification results are stored on a machine-readable medium in an XML (eXtensible Markup Language) file format.

Based on the classification results 40, the redeye correction module 18 corrects at least one of the candidate redeye areas 24 that is classified as a redeye artifact (FIG. 2, block 42). The image processing system 10 outputs the resulting output image 22 (e.g., stores the output image 22 in a database on a volatile or a non-volatile computer-readable medium, renders the output image 22 on a display, or renders the output image 22 on a print medium, such as paper).

IV. EXEMPLARY EMBODIMENTS OF THE IMAGE PROCESSING SYSTEM AND ITS COMPONENTS

A. Overview

The image processing system 10 typically is implemented by one or more discrete data processing modules (or components) that are not limited to any particular hardware, firmware, or software configuration. For example, in some implementations, the image processing system 10 is embedded in the hardware of any one of a wide variety of electronic apparatus, including printers, image and video recording and playback devices (e.g., digital still and video cameras, VCRs, and DVRs), cable or satellite set-top boxes capable of decoding and playing paid video programming, portable radio and satellite broadcast receivers, and portable telecommunications devices. The redeye detection module 12, the face detection module 14, the redeye classification module 16, and the redeye correction module 18 are data processing components that may be implemented in any computing or data processing environment, including in digital electronic circuitry (e.g., an application-specific integrated circuit, such as a digital signal processor (DSP)) or in computer hardware, firmware, device drivers, or software. In some embodiments, the functionalities of these data processing components 12-18 are combined into a single data processing component. In some embodiments, the respective functionalities of each of one or more of these data processing components 12-18 are performed by a respective set of multiple data processing components.

In some implementations, process instructions (e.g., machine-readable code, such as computer software) for implementing the methods that are executed by the image processing system 10, as well as the data it generates, are stored in one or more machine-readable media. Storage devices suitable for tangibly embodying these instructions and data include all forms of non-volatile computer-readable memory, including, for example, semiconductor memory devices, such as EPROM, EEPROM, and flash memory devices, magnetic disks such as internal hard disks and removable hard disks, magneto-optical disks, DVD-ROM/RAM, and CD-ROM/RAM.

B. An Exemplary Embodiment of the Redeye Detection Module

As explained above, the redeye detection module 12 determines candidate redeye areas 24 in the input image 20 (FIG. 2, block 26).

Figure 3:
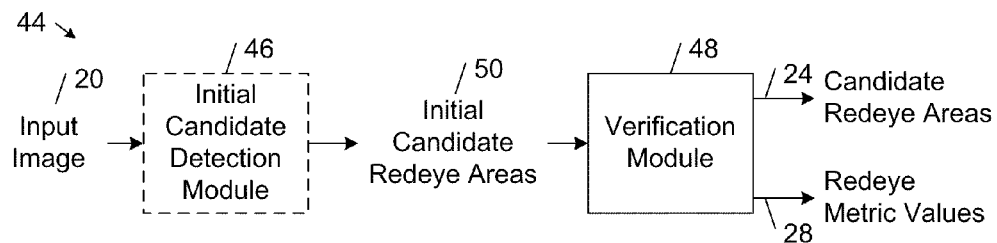
FIG. 3 is a block diagram of an embodiment of the redeye detection module shown in FIG. 1.

FIG. 3 is a block diagram of an embodiment 44 of the redeye detection module 12 (see FIG. 1). The redeye detection module 44 includes an initial candidate detection module 46 and an initial candidate redeye verification module 48. The initial candidate detection module 46 identifies an initial set 50 of candidate redeye areas in the input image 20. In some embodiments, the initial candidate detection module 46 identifies the initial candidate redeye areas 50 using multiple different redeye color models and merging the identified areas into the inclusive initial set of candidate redeye areas 50. The initial candidate redeye verification module 48 filters false alarms (i.e., initial candidate redeye areas with low likelihoods of corresponding to actual redeye artifacts in the input image 20) from the initial set of candidate redeye areas 50 to identify the candidate redeye areas 24. In some embodiments, the initial candidate redeye verification module 48 classifies the initial candidate redeye areas 50 based on consideration of multiple features in parallel using a machine learning framework to verify that the initial candidate redeye areas 50 correspond to actual redeyes in the input image 20 with greater accuracy and greater efficiency.

Additional details regarding the structure and operation of the initial candidate detection module 46 and the initial candidate redeye verification module 48 may be obtained from co-pending U.S. patent application Ser. No. 10/653,019, filed Aug. 29, 2003.

In some embodiments, the redeye detection module 44 outputs the candidate redeye areas 24 in the form of a list of bounding boxes each of which delimits a respective one of the detected candidate redeye areas. Associated with each such bounding box is a measurement in the confidence (e.g., probability) that the image patch delimited by the bounding box represents a redeye artifact, as well as a respective feature vector of redeye metric values representing a collection of confidence measurements each of which indicates the confidence that a particular redeye artifact feature exists in the associated bounding box. In one exemplary representation, $I(x,y)$ denotes the image forming element at location $(x,y)$ in the input image 20, a indexes the bounding boxes that are output by the redeye detection module 12, and the total number of candidate redeye areas is given by A. The coordinates representing the corners of each candidate redeye bounding box are given by $(x_a^{TL}, y_a^{TL})$, and $(x_a^{BR}, y_a^{BR})$, respectively, where "TL" denotes "top left" and "BR" denotes "bottom right". The confidence measure (or rating) is denoted $c_a$, and the feature vector is denoted by $v_a=[v_a^1, v_a^2, \ldots, v_a^N]$.

In some embodiments, the redeye detection module 44 compares the confidence rating $c_a$ to an empirically determined threshold $T_{artifact}$ to determine whether or not the corresponding image patch should be classified as a candidate redeye area 24 or as a non-redeye area.

C. An Exemplary Embodiment of the Face Detection Module

As explained above, the face detection module 14 ascertains candidate face areas 30 in the input image 20 (FIG. 2, block 32).

The following is a pseudo-code representation of an embodiment of a method by which the face detection module 14 ascertains the candidate face areas 30 in the input image 20 (see FIG. 1).

```
dX = 1, dY = 1, dS = √2
while size < height/2
    y = 1
    while y ≤ (height − size) + 1
        x = 1
        while x ≤ (width − size) + 1
            look for a face in the box {(x,y),
(x+size−1, y+size−1)}
            x = x + dX
        end
        y = y + dY
    end
    size = round( size * dS )
end
```

In this embodiment, the face detection module 14 looks for candidate face areas within a square "size" by "size" boundary box that is positioned at every location (x, y) in the input image 12, which has a width and a height respectively corresponding to the parameters "width" and "height" in the pseudo-code listed above. This process is repeated for square boundary boxes of different sizes.

Figure 4:
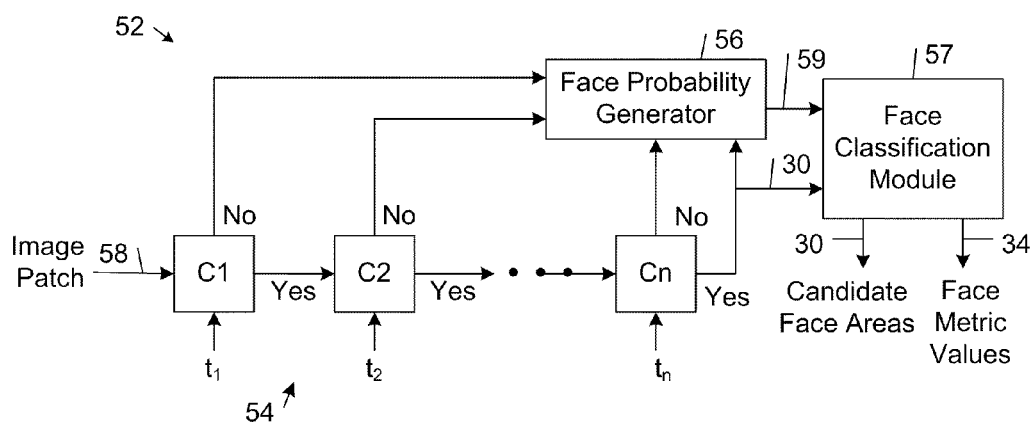
FIG. 4 is a block diagram of an embodiment of the face detection module shown in FIG. 1.

FIG. 4 is a block diagram of an embodiment 52 of the face detection module 14. The face detection module 52 includes a cascade 54 of classification stages $(C_1, C_2, \ldots, C_n$, where n has an integer value greater than 1) (also referred to herein as "classifiers"), a face probability generator 56, and a face classification module 57. In operation, each of the classification stages performs a binary discrimination function that classifies an image patch 58 that is derived from the input image 20 into a face class ("Yes") or a non-face class ("No") based on a discrimination measure that is computed from one or more face features (also referred to as "attributes") of the image patch 58. The discrimination function of each classification stage typically is designed to detect faces in a single pose or facial view (e.g., frontal upright faces). Depending on the evaluation results produced by the cascade 54, the face probability generator 56 assigns a respective face probability value 59 to each image patch 58. The face classification module 57 compares the assigned face probability value 59 to an empirically determined face threshold $T_{face}$ to determine whether to classify the image patch 58 as either a candidate face area 30 or a non-face area.

Each classification stage $C_i$ of the cascade 54 has a respective classification boundary that is controlled by a respective threshold $t_i$, where i=1, . . . , n. The value of the computed discrimination measure relative to the corresponding threshold determines the class into which the image patch 46 will be classified by each classification stage. For example, if the discrimination measure that is computed for the image patch 58 is above the threshold for a classification stage, the image patch 58 is classified into the face class (Yes) whereas, if the computed discrimination measure is below the threshold, the image patch 58 is classified into the non-face class (No). In this way, the face detection module 52 rejects image patches 58 part-way through the image patch evaluation process in which the population of patches classified as "faces" are progressively more and more likely to correspond to facial areas of the input image as the evaluation continues. The face probability generator 56 uses the exit point of the evaluation process to derive a measure of confidence that a patch is a face.

Figure 5:
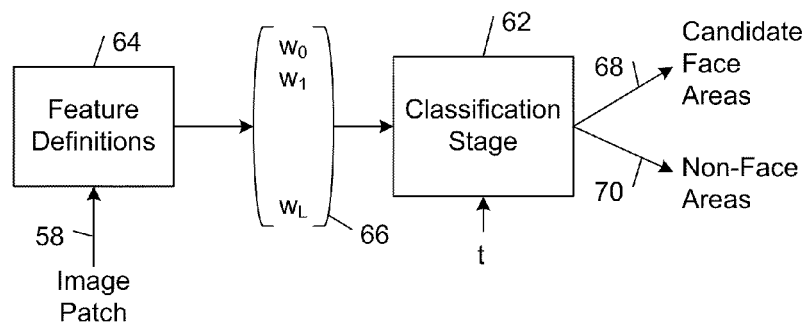
FIG. 5 is a block diagram of an embodiment of a single classification stage in an implementation of the face detection module shown in FIG. 4 that is designed to evaluate candidate face patches in an image.

FIG. 5 shows an exemplary embodiment of a single classification stage 62 in an embodiment of the classifier cascade 54. In this embodiment, the image patch 58 is projected into a feature space in accordance with a set of feature definitions 64. The image patch 58 includes any information relating to an area of the input image 20, including color values of input image pixels and other information derived from the input image 20 that is needed to compute feature weights. Each feature is defined by a rule that describes how to compute or measure a respective weight ($w_0, w_1, \ldots, w_L$) for an image patch that corresponds to the contribution of the feature to the representation of the image patch in the feature space spanned by the set of features 64. The set of weights ($w_0, w_1, \ldots, w_L$) that is computed for an image patch constitutes a feature vector 66. The feature vector 66 is input into the classification stage 62. The classification stage 62 classifies the image patch 58 into a set 68 of candidate face areas or a set 70 of non-face areas. If the image patch 58 is classified as a face area 30, it is passed to the next classification stage, which implements a different discrimination function.

In some implementations, the classification stage 62 implements a discrimination function that is defined in equation (1):

$$\sum_{\ell=1}^{L} g_\ell h_\ell(u) > 0 \quad (1)$$

where u contains values corresponding to the image patch 46 and $g_6$ are weights that the classification stage 62 applies to the corresponding threshold function $h_6(u)$, which is defined by:

$$h_\ell(u) = \begin{cases} 1, & \text{if } p_\ell w_\ell(u) > p_\ell t_\ell \\ 0, & \text{otherwise} \end{cases} \quad (2)$$

The variable $p_6$ has a value of +1 or −1 and the function $w_6(u)$ is an evaluation function for computing the features of the feature vector 66.

Additional details regarding the construction and operation of the classifier cascade 42 can be obtained from U.S. Pat. No. 7,099,510 and co-pending U.S. patent application Ser. No. 11/754,711, filed May 29, 2007.

In some embodiments, each of the image patches 58 is passed through at least two parallel classifier cascades that are configured to evaluate different respective facial views. Some of these embodiments are implemented in accordance with one or more of the multi-view face detection methods described in Jones and Viola, "Fast Multi-view Face Detection," Mitsubishi Electric Research Laboratories, MERL-TR2003-96, July 2003 (also published in IEEE Conference on Computer Vision and Pattern Recognition, Jun. 18, 2003).

In some embodiments, the face detection module 52 outputs the candidate face areas 30 in the form of a list of bounding boxes each of which delimits a respective one of the detected candidate face areas 30. Associated with each such bounding box is a measurement in the confidence (e.g., probability) that the bounding box represents a face, as well as a respective feature vector 30 of face metric values representing a collection of confidence measurements each of which indicates the confidence that a particular feature associated with a face exists in the associated bounding box. In one exemplary representation, I(x,y) denotes the image forming element at location (x,y) in the input image 20, f indexes the bounding boxes that are output by the face detection module 14, and the total number of candidate face areas is given by F. The coordinates representing the corners of each candidate face bounding box are given by $(x_f^{TL}, y_f^{TL})$, and $(x_f^{BR}, y_f^{BR})$, respectively. The confidence measure (or rating) is denoted $c_f$, and the feature vector is denoted by $v_f = [v_f^1, v_f^2, \ldots, v_f^M]$. If there are no candidate face areas detected in I(x,y), the face detection module 52 sets $c_f = 0$ and $v_f = [0, \ldots, 0]$. In these embodiments, the face classification module 57 determines the classification of each image patch 58 based on a respective comparison of the associated confidence metric $c_f$ to the face threshold value $T_{face}$.

In some embodiments, the values of the face threshold $T_{face}$ and the redeye artifact threshold $T_{artifact}$ are set such that the collection of all redeye artifacts returned by the redeye detection module 14 that overlap candidate face areas returned by the face detection module 14 has roughly equal numbers of detections and false positives.

D. An Exemplary Embodiment of the Redeye Classification Module

As explained above, the redeye classification module 16 assigns to each of the candidate redeye areas 24 a respective joint metric vector that includes metric values that are derived from the respective set of redeye metric values 28 and the set of face metric values 34 that is associated with a selected one of the candidate face areas 30 (FIG. 2, block 36).

Figure 6:
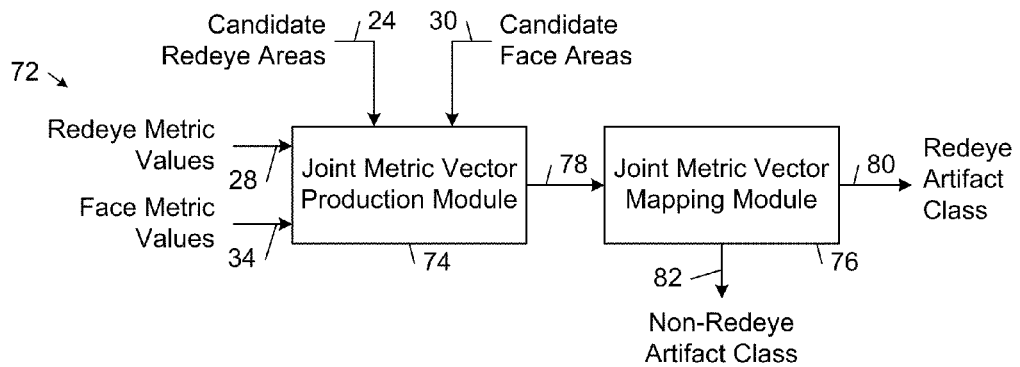
FIG. 6 is a block diagram of an embodiment of the redeye classification module shown in FIG. 1.

FIG. 6 shows an embodiment 72 of the redeye classification module 16 (see FIG. 1). The redeye classification module 72 includes a joint metric vector production module 74 and a joint metric vector mapping module 76. The joint metric vector production module 74 receives the redeye metric values 28 from the redeye detection module 12, receives the face metric values 34 from the face detection module 14, receives the candidate redeye areas 24 from the redeye detection module 12, receives the candidate face areas 30 from the face detection module 14, and produces a joint metric vector 78 for each of the candidate redeye areas 24. The joint metric vector mapping module 76 receives the joint metric vectors 78 from the joint metric vector production module 74. Based on the received data, the joint metric vector mapping module 76 classifies each of one or more of the candidate redeye areas 24 into one of a redeye artifact class 80 and a non-redeye artifact class 82.

Figure 7:
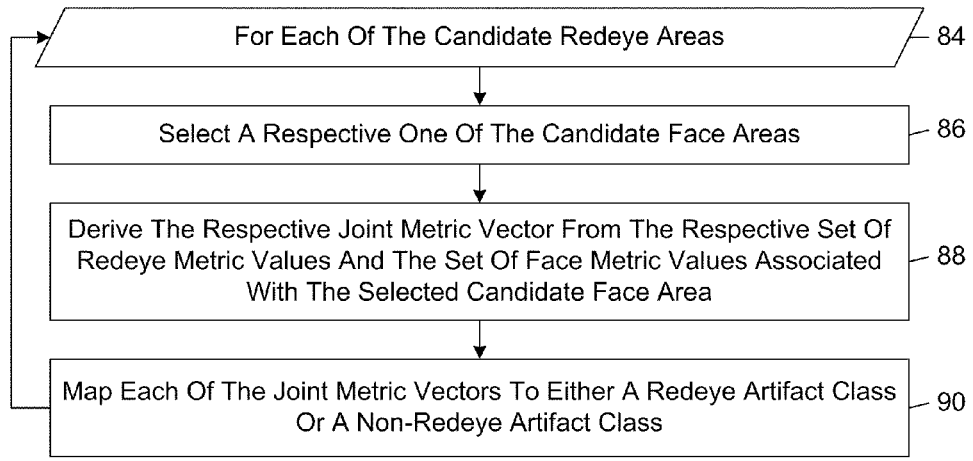
FIG. 7 is a flow diagram of an embodiment of a redeye classification method.

FIG. 7 shows an embodiment of a redeye classification method that is implemented by the redeye classification module 72.

In accordance with the embodiment of FIG. 7, for each of the candidate redeye areas 24 (FIG. 7, block 84), the joint metric vector production module 74 selects a respective one of the candidate face areas 30 (FIG. 7, block 86). The selected candidate face area 30 typically is the candidate face area 30 that is located closest to (e.g., the nearest adjacent candidate face area 30 or the candidate face area 30 that overlaps) the respective candidate redeye area 24 in the input image 20.

For each of the candidate redeye areas 24 (FIG. 7, block 84), the joint metric vector production module 74 derives the respective joint metric vector 78 from the respective set of redeye metric values 28 and the set of face metric values 34 that is associated with the selected candidate face area 30 (FIG. 7, block 88). In some embodiments, the joint vector production module 74 forms for each candidate redeye area 24, a respective joint vector $v_j^{fusion} = [c_a \, v_a \, c_f \, v_f]$ that is indexed by a joint index j=(a,f).

The joint metric vector mapping module 76 maps each of the joint metric vectors 78 to either the redeye artifact class 80 or the non-redeye artifact class 82 (FIG. 7, block 90). In general, the joint metric vector mapping module 76 may classify the joint metric vectors in a variety of different ways. In some embodiments, the joint metric vector mapping module 76 classifies the joint metric vectors 78 based on a machine learning classification process. In other embodiments, the joint metric vector mapping module 76 classifies the joint metric vectors 78 using a rules-based classification process.

Figure 9:
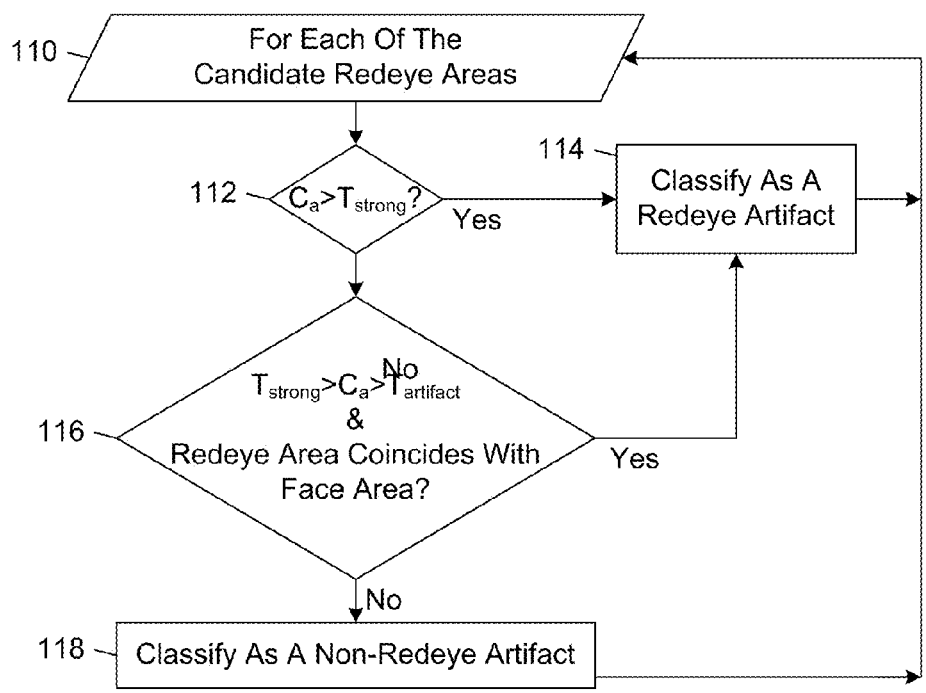
FIG. 9 is a flow diagram of an embodiment of a redeye classification method.

The following is a pseudo code description of the method of FIG. 9 using the notation described above:

1) For each artifact, find the nearest face indexed by f to form the joint index j=(a,f), and the joint vector $v_j^{fusion} = [c_a \, v_a \, c_f \, v_f]$. If no face is detected in I(x,y), set $c_f = 0$ and $v_f = [0, \ldots, 0]$.
2) Using a machine learning algorithm, classify each joint vector $v_j^{fusion}$ as being associated with a redeye artifact, or a non-redeye artifact.
3) For every index j associated with a redeye artifact, correct the pixels of I(x,y) in the range specified by $\{(x_a^{TL}, y_a^{TL}), (x_a^{BR}, y_a^{BR})\}$.

Figure 8:
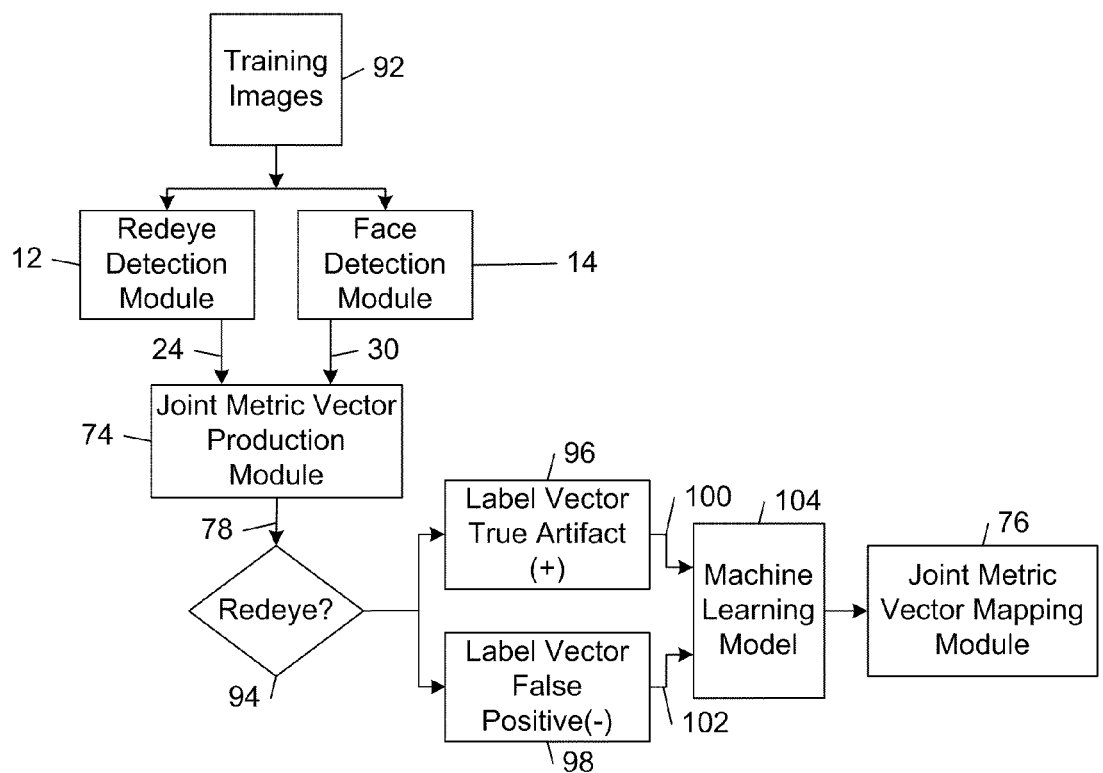
FIG. 8 is a flow diagram of a method of training an embodiment of the joint metric mapping module shown in FIG. 6.

FIG. 8 shows an embodiment of a method of training a machine learning based embodiment of the joint metric mapping module 76.

In accordance with the embodiment of FIG. 8, the redeye detection module 12 and the face detection module 14 (see FIG. 1) process a set of training images 92 to generate respective sets of candidate redeye areas 24 and associated redeye metric values, and respective sets of candidate face areas 14 and associated face metric values. Each of the detected candidate redeye areas 24 is compared against a set of redeye artifact areas contained in the training images 92, which are labeled manually by a human expert (or administrator), to determine whether each candidate represents a red eye artifact (positive sample) or a non-redeye artifact (negative sample) (step 94). The joint metric vector production module 74 (see FIG. 6) processes the output data received from the redeye detection module 12 and the face detection module 14 to generate a respective set of joint metric vectors 78 for both positive and negative samples (FIG. 8, blocks 96, 98). The resulting training data 100, 102 are sent to a machine learning model 104 to train the joint metric vector mapping module 76. In some implementations, the machine learning model 104 simultaneously selects features and trains the joint metric vector mapping module 76. In one exemplary implementation, the machine learning model 104 is based on Adaboost machine learning technology (see, e.g., Y. Freund and R. Schapire, "A short introduction to boosting", J. of Japanese Society for AI, pp. 771-780, 1999). Given a feature set design, the Adaboost based machine learning model simultaneously performs feature selection and classifier training. Additional details regarding the training of the joint metric mapping module 76 may be obtained by analogy from the process of training the single-eye classification engine 148 that is described in co-pending U.S. patent application Ser. No. 10/653,019, filed Aug. 29, 2003.

FIG. 9 shows an example of a rules-based embodiment of the method implemented by the joint metric mapping module 76. For each of the candidate redeye areas 24 (FIG. 9, block 110), if $c_a > T_{strong}$ (FIG. 9, block 112), the joint metric vector mapping module 76 classifies the candidate redeye area 24 as a redeye artifact (FIG. 9, block 114). If $c_a \leq T_{strong}$ (FIG. 9, block 112) but $T_{strong} > c_a > T_{artifact}$ and the candidate redeye area 24 coincides (i.e., overlaps) with one of the candidate face areas 30 (FIG. 9, block 116), the joint metric vector mapping module 76 classifies the candidate redeye area 24 as a redeye artifact (FIG. 9, block 114). Otherwise, the joint metric vector mapping module 76 classifies the candidate redeye area 24 as a non-redeye artifact (FIG. 9, block 118). In this embodiment, the confidence measure threshold $T_{strong}$ typically has a value that is greater than $T_{artifact}$ and is empirically determined to produce a good trade-off between false positive rate and redeye artifact detection rate.

The following is a pseudo code description of the method of FIG. 9 using the notation described above:
a) If $c_a > T_{strong}$, classify as a redeye-artifact, goto d).
b) If $(T_{strong} > c_a > T_{artifact})$ AND $\{(x_a^{TL}, y_a^{TL}), (x_a^{BR}, y_a^{BR})\}$ overlaps $\{(x_f^{TL}, y_f^{TL}), (x_f^{BR}, y_f^{BR})\}$ for some f, classify as a redeye artifact, goto d).
c) Classify as a non-redeye artifact.
d) Return to step a).

Figure 10:
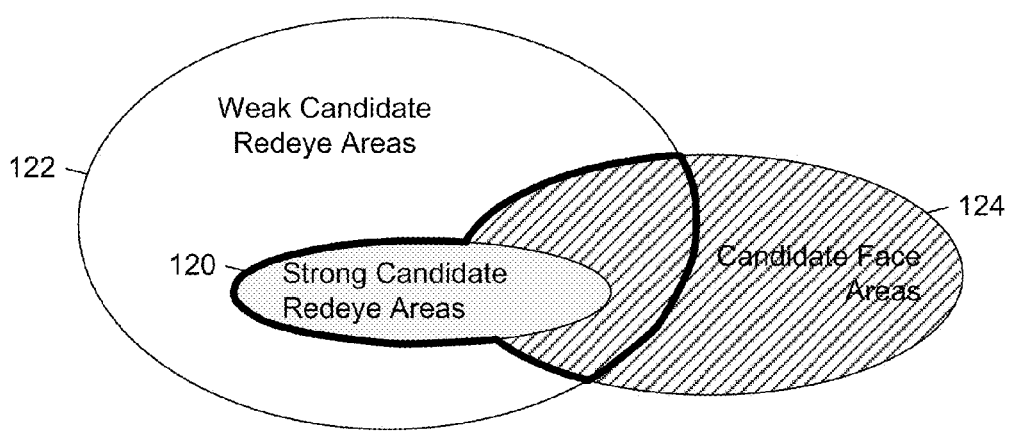
FIG. 10 is a Venn diagram showing an exemplary illustration of the classification space defined in the method of FIG. 9.

FIG. 10 is a Venn diagram showing an exemplary illustration of the classification space defined in the method of FIG. 9. In particular, the method of FIG. 9 partitions the search space into a set 120 of strong candidate redeye areas (i.e., where $c_a > T_{strong}$), a set 122 of weak candidate redeye areas (i.e., where $T_{strong} > c_a > T_{artifact}$), and a set 124 of candidate faces. Only artifacts that are "strongly" classified as redeye artifacts by the redeye classifier, or are considered redeye artifacts and overlap candidate face areas are classified as redeye artifacts. This collection corresponds to the items that are circumscribed by the dark line in FIG. 10. Using a mechanism such as this one results in a detector that can find redeyes outside of detected faces, but also has a low number of false positives. Based on a decision structure of this kind, there are several ways to speed up the face detector, which are described in section V.

E. An Exemplary Embodiment of the Redeye Correction Module

As explained above, the redeye correction module 18 corrects at least one of the candidate redeye areas that is classified as a redeye artifact (FIG. 2, block 42). The redeye correction module 18 may perform redeye correction in a variety of different ways.

In some embodiments, the redeye correction module 18 corrects the one or more candidate redeye areas in accordance with one or more of the redeye correction methods similar to those described in R. Ulichney and M. Gaubatz, "Perceptual-Based Correction Of Photo Redeye", Proc. of the 7th IASTED International Conf. on Signal and Image Processing, 2005. In these embodiments, the redeye correction module 18 identifies the regions of each red-eye artifact to be corrected. In this process, the redeye correction module 18 (1) de-saturates the identified regions, and (2) sets the average region luminances to values in accordance with a mapping that converts input region mean luminance $Y_{avg}$ to target mean luminance $f(Y_{avg})$. In order to preserve the subtle luminance structure in the eye, each red-eye luminance value is multiplied by the ratio of target luminance over original mean luminance.

It is also important to taper the correction for both de-saturation and luminance adjustment to avoid inducing an artificial hard edge in the eye. A taper that extends over 10% of the diameter of the eye region, D, was found to achieve good results. In some embodiments, the redeye correction module 18 applies a tapered correction mask to the regions of the redeye artifacts that have been identified for correction. The values of the tapered mask typically fall in the range [0,1]. In one exemplary embodiment, p represents the value of the tapered mask a single location. This value represents the percentage by which the pixel chrominance or luminance will be reduced, according to the given scheme. Y, Cb and Cr are the original pixel values within the identified regions.

Equations for the modified chrominance values Cb' and Cr' for this pixel are given as the following:

$$Cb' = (1-p)*Cb \quad (3)$$

$$Cr' = (1-p)*Cr \quad (4)$$

Y represents the luminance of a pixel and $Y_{avg}$ represents the mean pixel luminance (in digital count) for all pixels in the immediate vicinity of the detected artifact. The adjusted pixel luminance Y' is then given by $$Y' = (1-p)*Y + p*f(Y_{avg})/Y_{avg}*Y \quad (5)$$

where $f(Y_{avg}) = 0.167*Y_{avg} + 11.523$. This equation can therefore be rewritten $$Y' = (1-p)*Y + p*(0.167 + 11.523/Y_{avg})*Y \quad (6)$$

In other embodiments, the redeye correction module 18 corrects the one or more candidate redeye areas in accordance with one or more of the redeye correction methods described in co-pending U.S. patent application Ser. No. 10/653,019, filed Aug. 29, 2003.

V. ALTERNATIVE EMBODIMENTS OF THE FACE DETECTION MODULE

There are several ways in which the computational efficiency of the face detection module 14 can be improved.

In some embodiments, the detection results of the redeye detection module 12 are leveraged to allow the face detection module 14 to operate in a reduced accuracy mode with only a small effect on overall redeye detection performance of the image processing system 10. Specifically, the face detection module 14 is run on a down-sampled version of the input image 20. In some of these embodiments, the face detection module 14 down-samples the input image 20 to produce a reduced-resolution version of the input image 20 and detects the candidate redeye areas in the reduced-resolution version of the input image 20. Aside from reducing the computational and memory overhead, the effect of down-sampling an image prior to performing face detection is similar to setting dX, dY to values larger than 1 (please refer to the pseudo code presented in section IV.C).

In some embodiments, the regions of the input image 20 where the face detection module 14 is applied (i.e., the regions in which the detector "looks for faces") are constrained to regions that include the coordinates $\{(x_a^{TL}, y_a^{TL}), (x_a^{BR}, y_a^{BR})\}$. That is, in these embodiments, the face detection module 14 determines the candidate face areas 30 only in regions of the input image 20 that contain the coordinates of respective ones of the candidate redeye areas 24. In this way, the computational requirements of the face detection module 14 can be reduced.

Figure 11A:
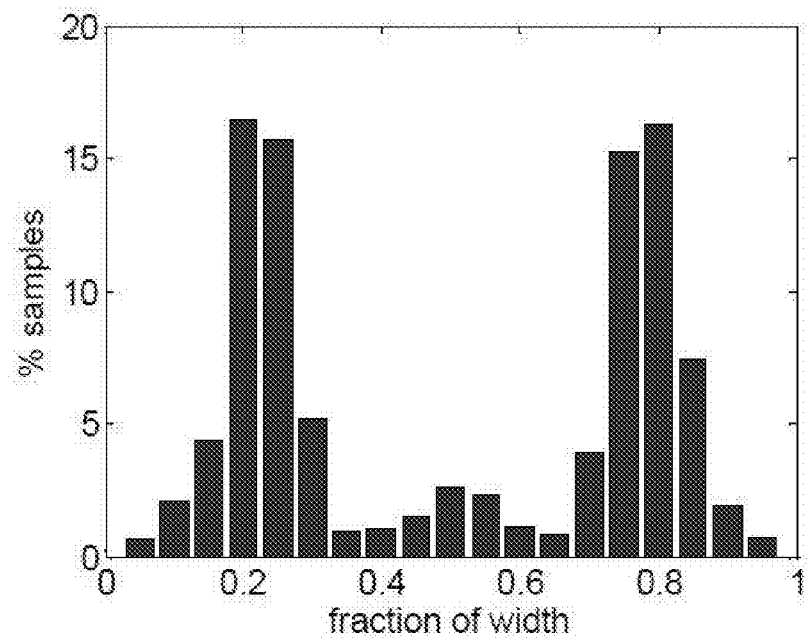
FIGS. 11A and 11B show histograms of resolution-independent locations of redeyes in face areas that are located in set of annotated training images.
Figure 11B:
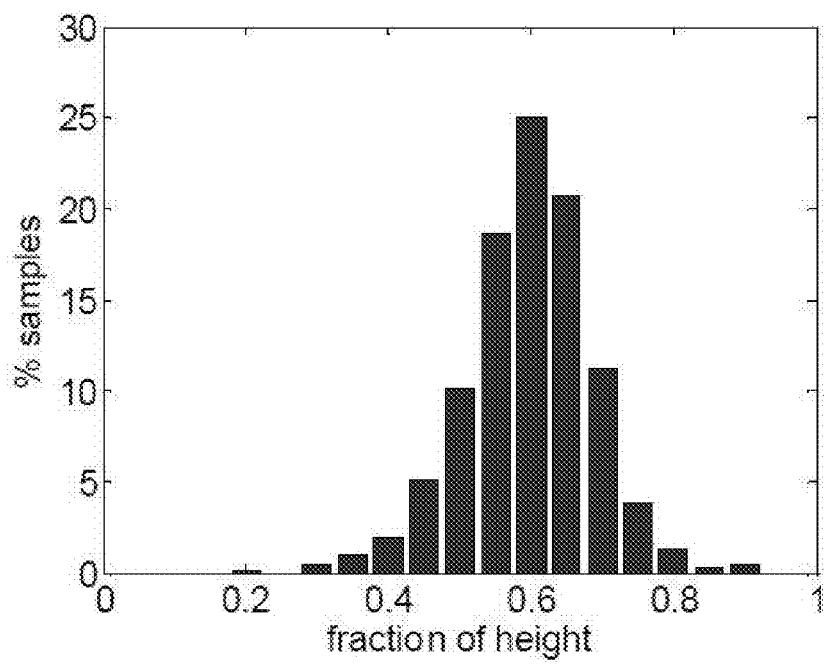

In some of the embodiments described in the preceding paragraph, the face detection search space is further reduced to areas where a sub-region of each candidate facial bounding box contains coordinates of the candidate redeye areas 24, based on the observation that most eyes/redeye artifacts generally occur in a sub-region within the face (see FIG. 2). In these embodiments, the face detection module 14 searches for each of the candidate face areas 30 only in regions of the input image 20 that contain the coordinates of respective ones of the candidate redeye areas 24 and that are delimited by the positions of a respective sliding window that circumscribes only a part of the candidate face area 30. These embodiments can be explained with reference to FIGS. 11A and 11B, which show histograms of resolution-independent locations of redeye artifacts in a face that are determined from an example set of annotated images. Although the artifacts occur at a fairly wide range of positions (see FIG. 11A), they generally occur within a vertically narrow region (see FIG. 11B); most occur within one third of the total area of a face. A pseudo-code representation of a modified version of the face detection method described above in section IV.C is shown below. In this representation, $p_{high}$ and $p_{low}$ denote relative distances from the top of the face bounding box to vertical positions within the face bounding box where eyes usually occur.

```
set dX > 1, dY > 1, dS = √2
while size < height/2
    a = 1
    while a ≤ A
        ymin = MAX( 1, MIN( height−size+1, y_a^BR − p_low ))
        ymax = MAX( 1, MIN( height−size+1, y_a^TL − p_high ))
        xmin = MAX( x_a^BR − size+1, 1 )
        xmax = MIN( x_a^TL , width−size+1 )
        y = ymin
        while y ≤ ymax
            x = xmin
            while x ≤ xmax
                look for a face in the box {(x,y),
(x+size−1, y+size−1)}
                x = x + dX
            end
            y = y + dY
        end
        a = a + 1
    end
    size = round( size * dS )
end
```

Figure 12:
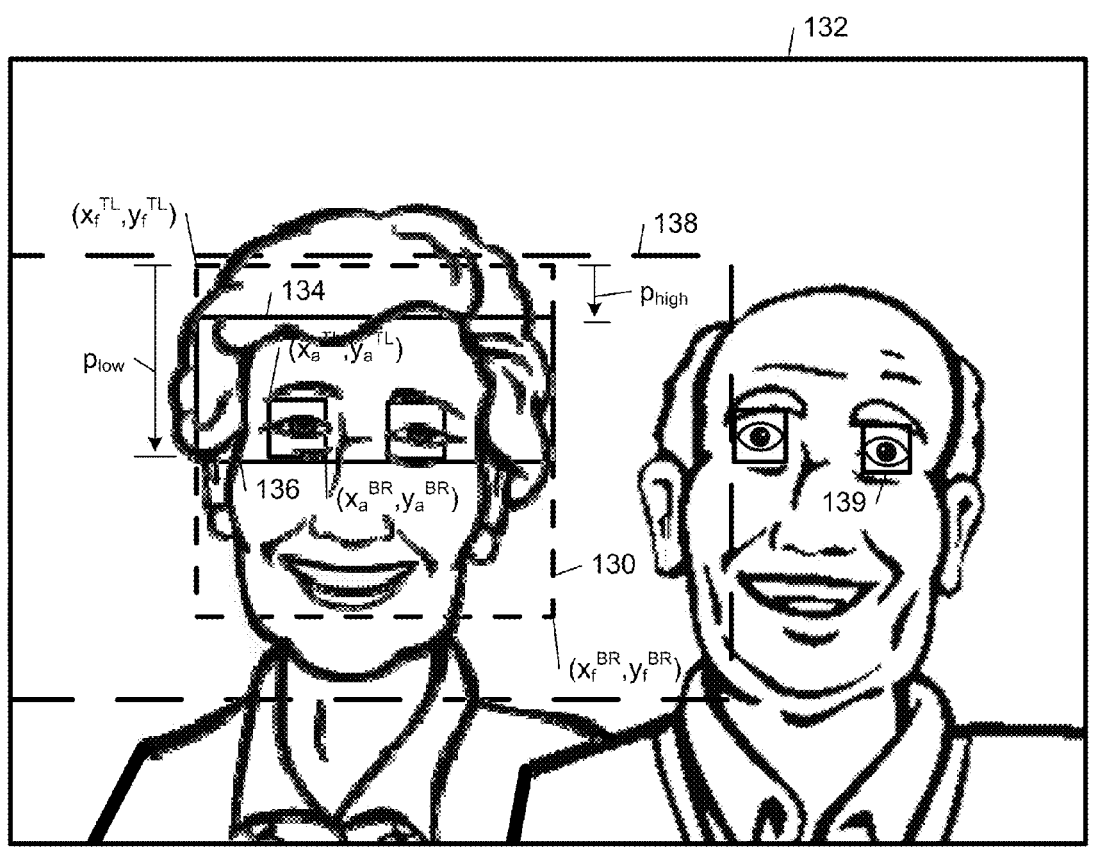
FIG. 12 is a diagrammatic view of an image and an overlying face search space that is used in an embodiment of the face detection module shown in FIG. 1.

FIG. 12 compares the face detection search spaces that are required for the different face detection methods described above. Under normal operation (see the pseudo code described in section IV.C), to detect faces at the current scale, the face detection module 14 would need to evaluate every patch having the size of the dashed square 130 in the entire input image 132. The dashed square 130 represents a candidate face window, and the solid lines 134, 136 delimit the region within this window where most redeye artifacts occur in accordance with the observation noted above. In the optimized case (see the pseudo code described in the preceding paragraph), the face detection module 14 need only search every such patch within the dashed outer rectangle 138 instead of the entire image 132, since it is only within this rectangle 138 that the detected (non-strong) redeye artifacts will overlap with the region in the dashed square 130 between the upper and lower solid lines 134, 136. Using the criterion given in the rules-based embodiment of the joint metric vector mapping module 76, "strong" redeye artifacts (e.g., detected redeye artifact 139) automatically are considered valid artifacts, regardless if an overlapping candidate face area is detected.

VI. EXEMPLARY ARCHITECTURES OF THE IMAGE PROCESSING SYSTEM AND ASSOCIATED APPLICATION ENVIRONMENTS

Figure 13:
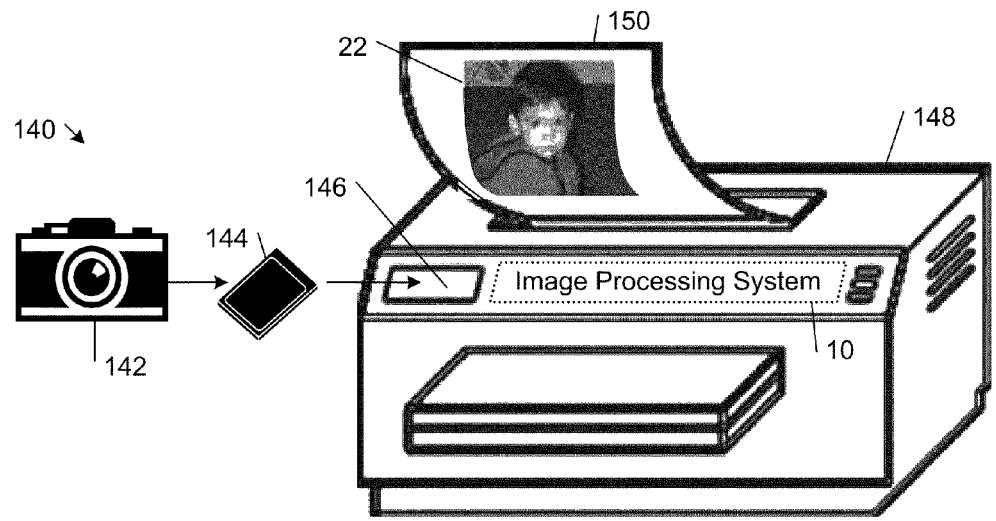
FIG. 13 is a diagrammatic view of a printer system incorporating an embedded embodiment of the image processing system shown in FIG. 1.

A. A First Exemplary Image Processing System Architecture and Application Environment FIG. 13 shows an exemplary application environment 140 for the detection and correction embodiments described herein. A digital camera 142 (e.g., an HPC® PHOTOSMART® digital camera available from Hewlett-Packard Company of Palo Alto, Calif., U.S.A.) captures images of scenes and stores the captured images on a memory card 144 (e.g., a secured digital (SD) multimedia card (MMC)). The memory card 144 may be plugged into a slot 146 of a printer system 148 (e.g., a PHOTOSMART® printer, which is available from Hewlett-Packard Company of Palo Alto, Calif., U.S.A.) that includes an embedded embodiment of the image processing system 10. Printer system 148 accesses data corresponding to an input image stored on the memory card 144, automatically detects and corrects redeye in the input image, and prints a hard copy 150 of the corrected output image 22. In some implementations, printer system 148 displays a preview of the corrected image 22 and awaits user confirmation to proceed with printing before the corrected image 22 is printed.

Figure 14:
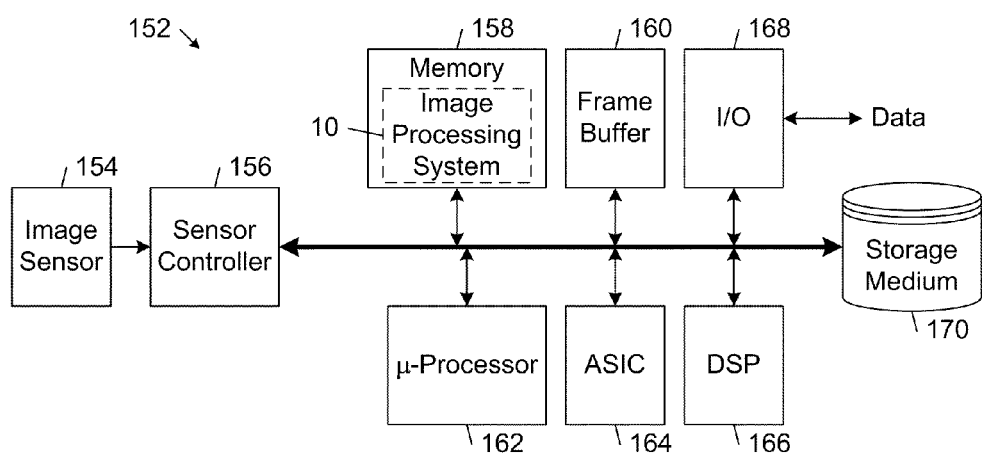
FIG. 14 is a block diagram of an embodiment of a digital camera system that incorporates an embodiment of the image processing system shown in FIG. 1.

B. A Second Exemplary Image Processing System Architecture and Application Environment FIG. 14 shows an embodiment of a digital camera system 152 that incorporates an embodiment of the image processing system 10. The digital camera system 152 may be configured to capture one or both of still images and video image frames. The digital camera system 152 includes an image sensor 154 (e.g., a charge coupled device (CCD) or a complementary metal-oxide-semiconductor (CMOS) image sensor), a sensor controller 156, a memory 158, a frame buffer 160, a microprocessor 162, an ASIC (application-specific integrated circuit) 164, a DSP (digital signal processor) 166, an I/O (input/output) adapter 168, and a storage medium 170. The values that are output from the image sensor 154 may be, for example, 8-bit numbers or 12-bit numbers, which have values in a range from 0 (no light) to 255 or 4095 (maximum brightness). In general, the image processing system 10 may be implemented by one or more of hardware and firmware components. In the illustrated embodiment, the image processing system 10 is implemented in firmware, which is loaded into memory 158. The storage medium 170 may be implemented by any type of image storage technology, including a compact flash memory card and a digital video tape cassette. The image data stored in the storage medium 170 may be transferred to a storage device (e.g., a hard disk drive, a floppy disk drive, a CD-ROM drive, or a non-volatile data storage device) of an external processing system (e.g., a computer or workstation) via the I/O subsystem 168.

The microprocessor 162 choreographs the operation of the digital camera system 152, including processing the input image captured by the image sensor 154 in accordance with the image processing methods that are described herein. Before detecting and correcting redeye artifacts, however, the microprocessor 152 typically is programmed to perform various operations on the image data captured by the image sensor 154, including one or more of the following operations: demosaicing; color correction; and image compression. The microprocessor 152 typically is programmed to perform various operations on the resulting redeye corrected output image 22, including one or more storage operations and one or more transmission operations.

Figure 15:
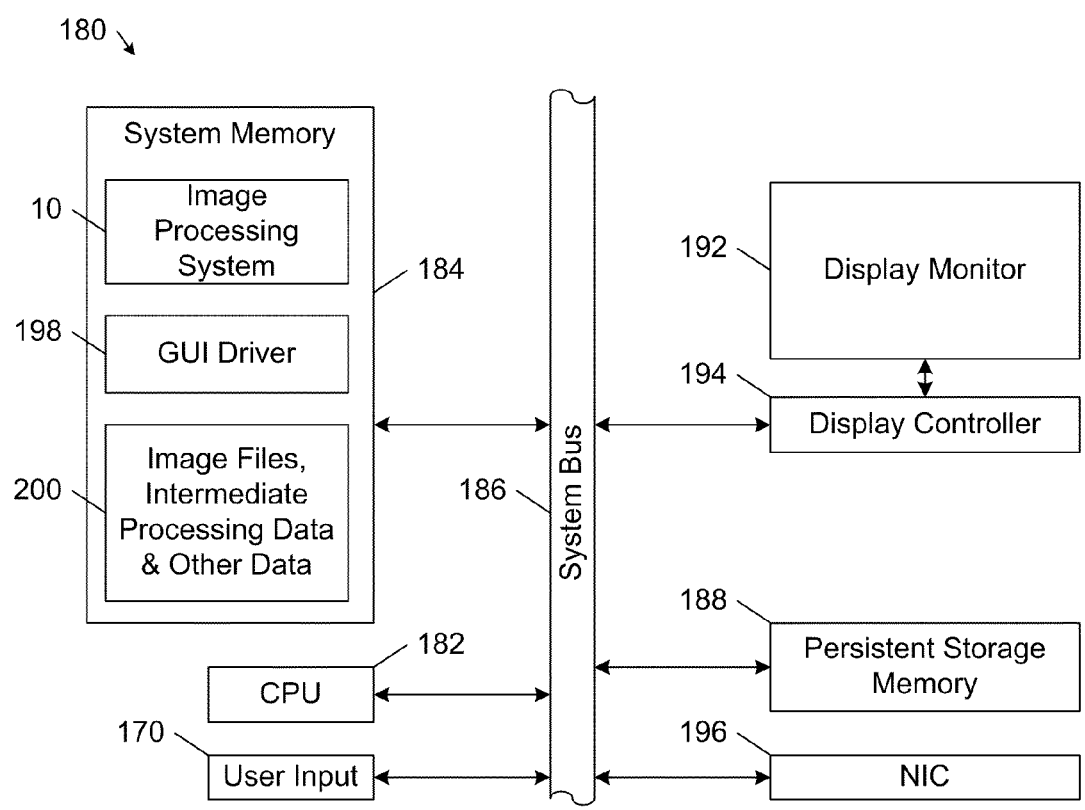
FIG. 15 is a block diagram of an embodiment of a computer system that is programmable to implement an embodiment of the image processing system shown in FIG. 1.

C. A Third Exemplary Image Processing System Architecture and Application Environment FIG. 15 shows an embodiment of a computer system 180 that incorporates an embodiment of the image processing system 10. The computer system 180 includes a processing unit 182 (CPU), a system memory 184, and a system bus 186 that couples processing unit 182 to the various components of the computer system 180. The processing unit 182 typically includes one or more processors, each of which may be in the form of any one of various commercially available processors. The system memory 184 typically includes a read only memory (ROM) that stores a basic input/output system (BIOS) that contains start-up routines for the computer system 180 and a random access memory (RAM). The system bus 186 may be a memory bus, a peripheral bus or a local bus, and may be compatible with any of a variety of bus protocols, including PCI, VESA, Microchannel, ISA, and EISA. The computer system 180 also includes a persistent storage memory 188 (e.g., a hard drive, a floppy drive, a CD ROM drive, magnetic tape drives, flash memory devices, and digital video disks) that is connected to the system bus 186 and contains one or more computer-readable media disks that provide non-volatile or persistent storage for data, data structures and computer-executable instructions.

A user may interact (e.g., enter commands or data) with the computer system 180 using one or more input devices 190 (e.g., a keyboard, a computer mouse, a microphone, joystick, and touch pad). Information may be presented through a graphical user interface (GUI) that is displayed to the user on a display monitor 192, which is controlled by a display controller 184. The computer system 180 also typically includes peripheral output devices, such as speakers and a printer. One or more remote computers may be connected to the computer system 180 through a network interface card (NIC) 196.

As shown in FIG. 12, the system memory 184 also stores an embodiment of the image processing system 10, a GUI driver 198, and a database 200 containing image files corresponding to the input image 20 and the redeye corrected output image 22, intermediate processing data, and other data. In some embodiments, the image processing system 10 interfaces with the GUI driver 198 and the user input 190 to control the redeye correction operations performed on the input image 20. In some embodiments, the computer system 180 additionally includes a graphics application program that is configured to render image data on the display monitor 192 and to perform various image processing operations on one or both of the input image 20 and the redeye corrected output image 22.

VI. CONCLUSION

The embodiments that are described in detail herein are capable of detecting redeye artifacts in images. These embodiments leverage both redeye detection and face detection processes to achieve accurate detection of redeye artifacts with low false positive rates. In this way, these embodiments achieve a better trade-off between false positives and detected artifacts. In addition, these embodiments can be implemented with reduced computational expense of the face-detection component. Due to their efficient use of processing and memory resources, the embodiments that are described herein readily may be implemented in a variety of different application environments, including applications environments, such as embedded environments, which are subject to significant processing and memory constraints.

Other embodiments are within the scope of the claims.

What is claimed is:

1. A machine-implemented method of processing an input image, comprising:
    determining, by a processor, candidate redeye areas in the input image based on redeye features extracted from the image, wherein the determining comprises associating with each of the candidate redeye areas a respective set of one or more redeye metric values each of which indicates a respective confidence that a respective one of the redeye features exists in the respective candidate redeye area;
    ascertaining candidate face areas in the input image based on face features extracted from the image, wherein the ascertaining comprises associating with each of the candidate face areas a respective set of one or more face metric values each of which represents indicates a respective confidence that a respective one of the face features exists in the respective candidate face area;
    assigning to each of the candidate redeye areas a respective joint metric vector comprising metric values derived from the respective set of redeye metric values and the set of face metric values associated with a selected one of the candidate face areas;
    classifying each of one or more of the candidate redeye areas as either a redeye artifact or a non-redeye artifact based on the respective joint metric vector assigned to the candidate redeye area, wherein the classifying comprises for each of the one or more candidate redeye areas classifying the respective joint metric vector as being associated with either a redeye artifact or a non-redeye artifact based on a machine learning model trained on joint metric vectors comprising redeye metric values indicating respective confidences that respective ones of the redeye features exist in respective sample redeye areas and face metric values indicating respective confidences that respective ones of the face features exist in respective sample face areas; and
    correcting at least one of the candidate redeye areas classified as a redeye artifact.

2. The method of claim 1, wherein each of the redeye metric values provides a respective indication of a degree to which the respective candidate redeye area corresponds to a redeye artifact, and each of the face metric values provides a respective indication of a degree to which the respective candidate face area corresponds to a face.

3. The method of claim 2, wherein the determining comprises associating with each of the candidate redeye areas a respective one of the redeye metric values corresponding to a measure of confidence that the respective candidate redeye area corresponds to a redeye artifact.

4. The method of claim 2, wherein the determining comprises associating with each of the candidate redeye areas ones of the redeye metric values providing respective indications that the candidate redeye area includes respective redeye features.

5. The method of claim 2, wherein the ascertaining comprises associating with each of the candidate face areas a respective one of the face metric values corresponding to a measure of confidence that the respective candidate face area corresponds to a face.

6. The method of claim 2, wherein the ascertaining comprises associating with each of the candidate face areas ones of the face metric values providing respective indications that the candidate face area includes respective facial features.

7. The method of claim 1, wherein the assigning comprises for each of the candidate redeye areas
    selecting a respective one of the candidate face areas, and
    deriving the respective joint metric vector from the respective set of redeye metric values and the set of face metric values associated with the selected candidate face area.

8. The method of claim 7, wherein the selecting comprises selecting the candidate face area located closest to the candidate redeye area in the input image.

9. The method of claim 1, wherein the classifying comprises mapping each of the respective joint metric vectors to either a redeye artifact class or a non-redeye artifact class.

10. The method of claim 9, wherein each of the joint metric vectors comprises a redeye confidence measure value indicating a degree to which the respective candidate redeye area corresponds to a redeye artifact, a face confidence measure value indicating a degree to which the selected candidate face area corresponds to a face, at least one metric value corresponding to a respective indication that the respective candidate redeye area includes a respective redeye feature, and at least one metric value corresponding to a respective indication that the selected candidate face area includes a respective facial feature.

11. The method of claim 10, wherein the mapping comprises mapping to the redeye artifact class ones of the joint metric vectors comprising respective redeye probabilities values above a first threshold value.

12. A machine-implemented method of processing an input image, comprising:
    determining, by a processor, candidate redeye areas in the input image, wherein the determining comprises associating with each of the candidate redeye areas a respective set of one or more redeye metric values;
    ascertaining candidate face areas in the input image, wherein the ascertaining comprises associating with each of the candidate face areas a respective set of one or more face metric values;
    assigning to each of the candidate redeye areas a respective joint metric vector comprising metric values derived from the respective set of redeye metric values and the set of face metric values associated with a selected one of the candidate face areas, wherein each of the joint metric vectors comprises a redeye confidence measure value indicating a degree to which the respective candidate redeye area corresponds to a redeye artifact, a face confidence measure value indicating a degree to which the selected candidate face area corresponds to a face, at least one metric value corresponding to a respective indication that the respective candidate redeye area includes a respective redeye feature, and at least one metric value corresponding to a respective indication that the selected candidate face area includes a respective facial feature;
    classifying each of one or more of the candidate redeye areas as either a redeye artifact or a non-redeye artifact based on the respective joint metric vector assigned to the candidate redeye area, wherein the classifying comprises mapping each of the respective joint metric vectors to either a redeye artifact class or a non-redeye artifact class, and the mapping comprises mapping to the redeye artifact class ones of the joint metric vectors comprising respective redeye probabilities values above a first threshold value and mapping to the redeye artifact class each of the joint metric vectors that is associated with a respective one of the candidate redeye areas that overlaps the associated candidate face area and that comprises a respective redeye probability value between the first threshold value and a second threshold value lower than the first threshold value.

13. The method of claim 1, wherein the ascertaining comprises down-sampling the input image to produce a reduced-resolution version of the input image and detecting the candidate redeye areas in the reduced-resolution version of the input image.

14. The method of claim 1, wherein the ascertaining comprises determining the candidate face areas only in regions of the input image containing coordinates of respective ones of the candidate redeye areas.

15. The method of claim 14, wherein the ascertaining comprises determining each of the candidate faces areas only in regions of the input image that contain coordinates of respective ones of the candidate redeye areas and that are delimited by a position of a respective sliding window that circumscribes only a part of the candidate face area.

16. Apparatus for processing an input image, comprising:
a memory; and
a processing unit coupled to the memory and operable to perform operations comprising
determining candidate redeye areas in the input image based on redeye features extracted from the image, wherein in the determining the processing unit is operable to perform operations comprising associating with each of the candidate redeye areas a respective set of one or more redeye metric values each of which indicates a respective confidence that a respective one of the redeye features exists in the respective candidate redeye area,
ascertaining candidate face areas in the input image based on face features extracted from the image, wherein in the ascertaining the processing unit is operable to perform operations comprising associating with each of the candidate face areas a respective set of one or more face metric values each of which represents indicates a respective confidence that a respective one of the face features exists in the respective candidate face area,
assigning to each of the candidate redeye areas a respective joint metric vector comprising metric values derived from the respective set of redeye metric values and the set of face metric values associated with a selected one of the candidate face areas,
classifying each of one or more of the candidate redeye areas as either a redeye artifact or a non-redeye artifact based on the respective joint metric vector assigned to the candidate redeye area, wherein the classifying comprises for each of the one or more candidate redeye areas classifying the respective joint metric vector as being associated with either a redeye artifact or a non-redeye artifact based on a machine learning model trained on joint metric vectors comprising redeye metric values indicating respective confidences that respective ones of the redeye features exist in respective sample redeye areas and face metric values indicating respective confidences that respective ones of the face features exist in respective sample face areas, and
correcting at least one of the candidate redeye areas classified as a redeye artifact.

17. The apparatus of claim 16, wherein each of the redeye metric values provides a respective indication of a degree to which the respective candidate redeye area corresponds to a redeye artifact, and each of the face metric values provides a respective indication of a degree to which the respective candidate face area corresponds to a face.

18. The apparatus of claim 16, wherein in the assigning the processing unit is operable to perform operations comprising for each of the candidate redeye areas
selecting a respective one of the candidate face areas, and
deriving the respective joint metric vector from the respective set of redeye metric values and the set of face metric values associated with the selected candidate face area.

19. The apparatus of claim 16, wherein in the ascertaining the processing unit is operable to perform operations comprising determining the candidate face areas only in regions of the input image containing coordinates of respective ones of the candidate redeye areas.

20. A non-transitory computer readable medium storing computer-readable instructions causing a computer to perform operations comprising:
determining candidate redeye areas in the input image based on redeye features extracted from the image, wherein the determining comprises associating with each of the candidate redeye areas a respective set of one or more redeye metric values each of which indicates a respective confidence that a respective one of the redeye features exists in the respective candidate redeye area;
ascertaining candidate face areas in the input image based on face features extracted from the image, wherein the ascertaining comprises associating with each of the candidate face areas a respective set of one or more face metric values each of which represents indicates a respective confidence that a respective one of the face features exists in the respective candidate face area;
assigning to each of the candidate redeye areas a respective joint metric vector comprising metric values derived from the respective set of redeye metric values and the set of face metric values associated with a selected one of the candidate face areas;
classifying each of one or more of the candidate redeye areas as either a redeye artifact or a non-redeye artifact based on the respective joint metric vector assigned to the candidate redeye area, wherein the classifying comprises for each of the one or more candidate redeye areas classifying the respective joint metric vector as being associated with either a redeye artifact or a non-redeye artifact based on a machine learning model trained on joint metric vectors comprising redeye metric values indicating respective confidences that respective ones of the redeye features exist in respective sample redeye areas and face metric values indicating respective confidences that respective ones of the face features exist in respective sample face areas; and
correcting at least one of the candidate redeye areas classified as a redeye artifact.

* * * * *